Oct. 17, 1933.  J. NOTKIN  1,931,413
ICE CREAM CONE
Filed April 5, 1933
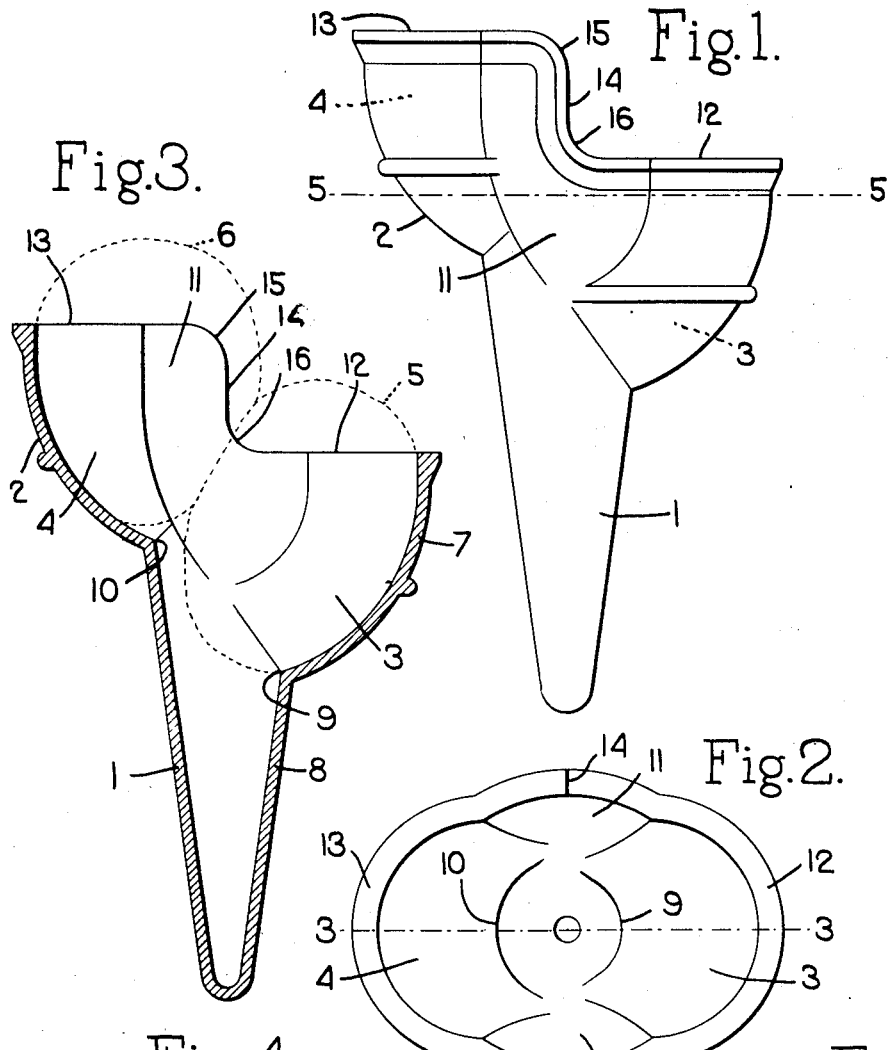
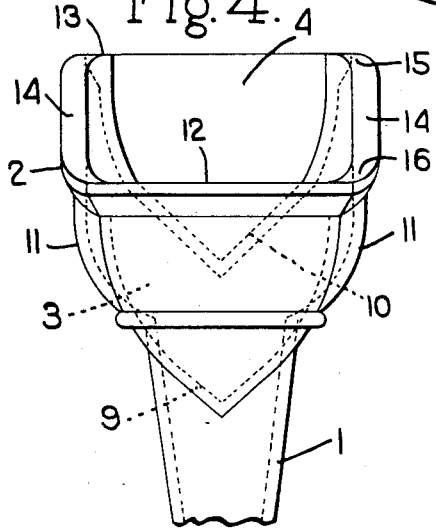
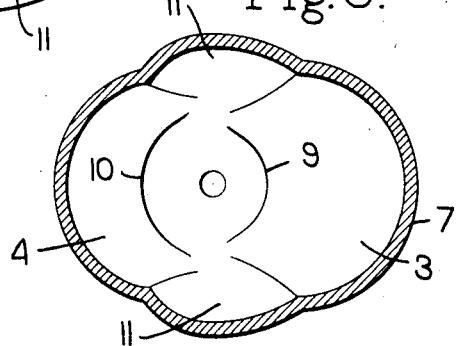
Inventor.
Jacob Notkin
by Heard Smith & Tennant.
Attys.

Patented Oct. 17, 1933

1,931,413

UNITED STATES PATENT OFFICE 1,931,413

ICE CREAM CONE

Jacob Notkin, Portsmouth, N. H.

Application April 5, 1933. Serial No. 664,528

4 Claims. (Cl. 99—10)

This invention relates to ice cream cones of that type which are provided with a plurality of pockets, each adapted to receive and retain a scoop of ice cream, and one of the objects of the invention is to provide an ice cream cone of this type having a plurality of pockets which communicate with each other but which are arranged at different positions in a vertical direction or in the direction of the axis of the cone.

An ice cream cone embodying my invention comprises a handle portion and an ice-cream-receiving portion at the upper end of the handle portion which is formed with two or more communicating pockets each adapted to hold a scoop of ice cream, said pockets being arranged one above the other or in different vertical positions.

In using an ice cream cone embodying this invention the lowest pocket will preferably be filled first and then scoops of ice cream will be placed in the other pockets in the order of their vertical positions, the last pocket to be filled being the topmost or upper pocket. Since the various pockets communicate with each other the result will be that each scoop of ice cream except that occupying the lowest pocket will be partially resting on the scoop of ice cream in the pocket directly below.

In order to give an understanding of the invention I have illustrated in the drawing a selected embodiment thereof which will now be described after which the novel features will be pointed out in the appended claims.

Fig. 1 is a side view of an ice cream cone embodying my invention;

Fig. 2 is a top plan view;

Fig. 3 is a section on the line 3—3, Fig. 2;

Fig. 4 is a fragmentary edge view;

Fig. 5 is a section on the line 5—5, Fig. 1;

The ice cream cone embodying the invention will preferably be made of edible material, as ice cream cones usually are, and it is molded so as to present a handle or stem portion 1 and an ice-cream-receiving portion at the upper end of the stem portion. This ice cream-receiving portion is formed to present a plurality of pockets which communicate with each other and each of which is of a size to receive a scoop of ice cream, said pockets being arranged one above the other.

The ice-cream-receiving portion of the cone is indicated generally at 2 and in the embodiment of the invention herein illustrated it is shaped to present a lower pocket 3 and an upper pocket 4, said pockets communicating with each other. These pockets are shown as oppositely disposed and are preferably of substantially the same size, each pocket having sufficient capacity to hold a scoop of ice cream as shown by the dotted lines 5 and 6 in Fig. 3.

The wall 7 of the lower pocket 3 is preferably parti-cylindrical in a horizontal plane and convexly curved in a vertical plane, said wall joining the wall 8 of the stem along the curved line 9. The outer wall of the upper pocket 4 has a similar shape and it joins to or merges with the wall of the stem along the line 10 which is at a higher elevation than the line 9 and consequently at a point on the conical-shaped stem 1 of larger diameter than that of the stem along the line 9. A cone having this construction presents two pockets each having a parti-bowl shape.

The serving 5 of ice cream which occupies the lower pocket 3 will preferably fill the portion of the stem between the lines 9 and 10 and the serving 6 of ice cream which occupies the upper pocket 4 will fill the pocket 4 and will be partially supported on the lower serving 5 of ice cream.

The side portions of the ice cream cone which connect the pockets 3 and 4 may conveniently be bumped or curved outwardly slightly as shown at 11 thus giving extra or added width transversely of the ice-cream-receiving portion along the central line. In the construction shown the upper edge 12 of the lower pocket extends substantially parallel to the upper edge 13 of the upper pocket but these upper edges 12 and 13 are in different horizontal planes. Said upper edges are connected by the vertical wall portion 14, the upper and lower ends of which are curved as shown at 15 and 16 to merge into the upper edges 13 and 12 of the two pockets.

In using an ice cream cone having this construction the lower pocket 3 will first be filled with its serving 5 of ice cream and then the second serving 6 of ice cream will be placed in the upper pocket 4, said serving 6 of ice cream being partially supported by the concave wall of the pocket and partially by the serving 5 in the lower pocket.

While I have shown herein an ice cream cone having two pockets arranged one above the other yet it will be obvious that the invention would not be departed from if the cone were made with more than two pockets communicating with each other and having different vertical positions. For instance, the cone might be made with three pockets each having a different vertical position or even four such pockets.

I claim:—

1. An ice cream cone of edible material comprising a hollow handle portion or stem and an ice-cream-receiving portion presenting a plurality of pockets, each pocket being adapted to receive a scoop of ice cream and communicating both with the hollow stem and with the other pockets, said pockets being arranged in different vertical positions.

2. An ice cream cone of edible material comprising a hollow stem portion and an ice-cream-receiving portion formed to present two communicating pockets, each adapted to receive a scoop of ice cream, one pocket being nearer the end of the stem than the other pocket.

3. An ice cream cone having a hollow stem or handle portion and an ice cream receiving portion carried thereby and presenting a plurality of communicating pockets situated at different distances from the end of the stem.

4. An ice cream cone having a hollow stem or handle portion and an ice cream receiving portion carried thereby and presenting a plurality of communicating pockets situated at different distances from the end of the stem, the side walls of the pockets being curved outwardly thereby providing enlarged pockets for the reception of the ice cream.

JACOB NOTKIN.